(12) United States Patent
Keate et al.

(10) Patent No.: US 8,144,260 B2
(45) Date of Patent: Mar. 27, 2012

(54) SYSTEM AND APPARATUS FOR RECEIVING DIGITAL TELEVISION SIGNALS

(75) Inventors: Christopher R. Keate, Mountain View, CA (US); Armando V. Lopez, Mountain View, CA (US); Eric S. Tang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/815,630

(22) Filed: Jun. 15, 2010

(65) Prior Publication Data

US 2010/0321271 A1     Dec. 23, 2010

Related U.S. Application Data

(63) Continuation of application No. 11/915,262, filed as application No. PCT/US2006/020399 on May 25, 2006, now Pat. No. 7,738,046.

(60) Provisional application No. 60/684,830, filed on May 26, 2005.

(51) Int. Cl.
*H04N 5/44* (2011.01)
*H04N 5/50* (2006.01)

(52) U.S. Cl. ........ 348/725; 348/729; 348/720; 348/731; 348/706; 348/180; 725/72

(58) Field of Classification Search .................. 348/725, 348/729, 720, 732, 731, 706, 570, 180; 375/347, 375/346, 267; 725/72; 455/193.1, 226.2, 455/226.3, 134, 135; 343/751, 777, 853
See application file for complete search history.

(56) References Cited

U.S. PATENT DOCUMENTS

| | | |
|---|---|---|
| 7,738,046 B2 | 6/2010 | Keate et al. |
| 2002/0083458 A1 | 6/2002 | Henderson et al. |

*Primary Examiner* — Jefferey Harold
*Assistant Examiner* — Jean W Desir
(74) *Attorney, Agent, or Firm* — Sterne, Kessler, Goldstein & Fox P.L.L.C.

(57) ABSTRACT

Apparatus and methods to receive and display digital television signals are described. In one embodiment, an apparatus to receive digital television signals comprises an antenna assembly coupled to the signal processing circuitry and comprising a first antenna positioned to maximize reception in a first direction and a second antenna positioned to maximize reception in a second direction, different from the first direction, and a processor coupled to the antenna assembly and comprising a selection logic module to select an antenna to receive a digital television signal for a specific channel, and a tuning logic module to configure the antenna assembly to receive a signal via a selected antenna.

20 Claims, 8 Drawing Sheets

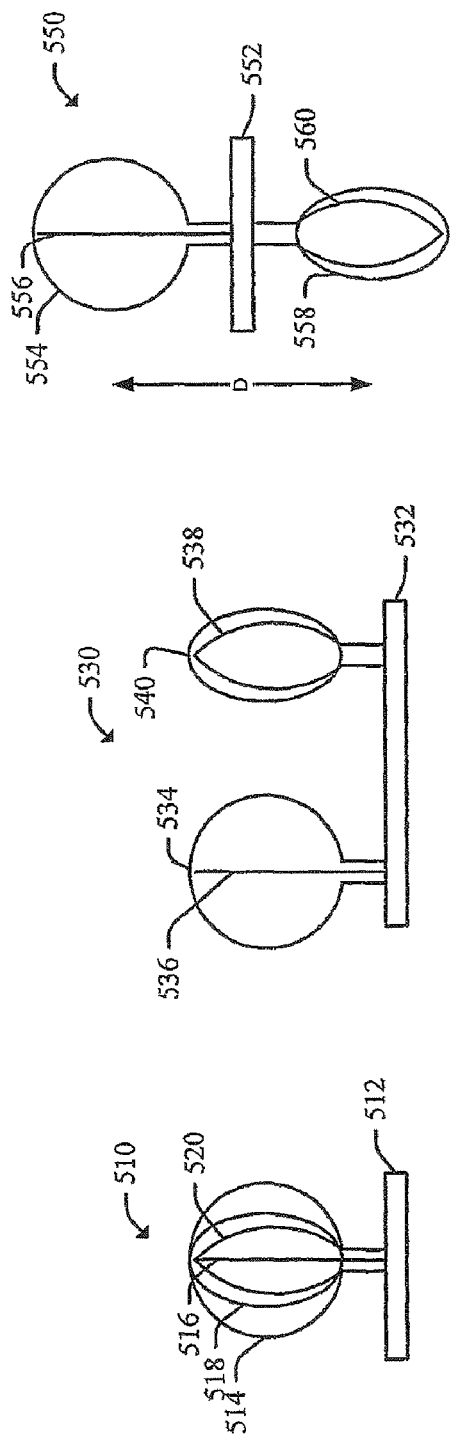
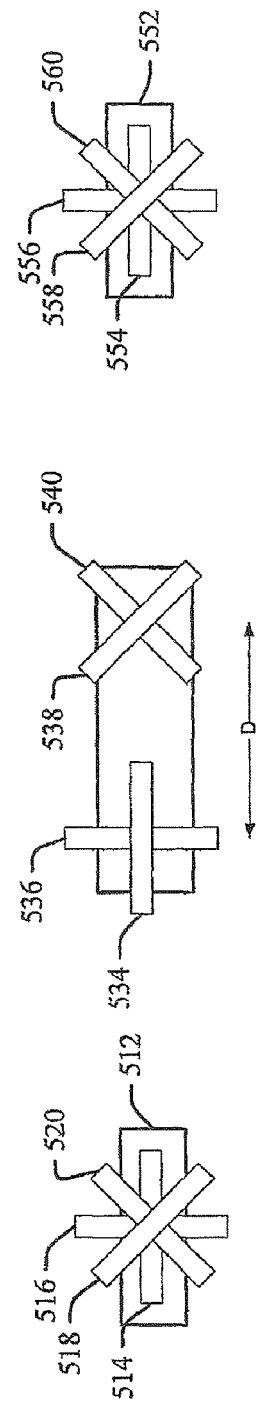

| Channel | Antenna | Attenuator Settings | SNR |
|---------|---------|---------------------|-----|
| 1 | 1 | xyz | abc |
| 2 | 2 | xyz | abc |
| 3 | 1 | xyz | abc |
| 4 | 4 | xyz | abc |
| 5 | 3 | xyz | abc |
| . | . | . | . |
| . | . | . | . |
| . | . | . | . |
| N | N | xyz | abc |

SYSTEM AND APPARATUS FOR RECEIVING DIGITAL TELEVISION SIGNALS

CROSS-REFERENCE TO RELATED APPLICATIONS

This application is a continuation of U.S. patent application Ser. No. 11/915,262, filed May 25, 2006, now U.S. Pat. No. 7,738,046, which is a National Stage of International Application No. PCT/2006/020399, filed May 25, 2006, which claims the benefit of U.S. Provisional Patent Application Ser. No. 60/684,830, filed May 26, 2005. U.S. patent application Ser. No. 11/915,262, filed May 25, 2006, is incorporated herein by reference in its entirety.

BACKGROUND OF THE INVENTION

Description of the Related Art

The subject matter described herein relates generally to the field of electronic communication and more particularly to digital television signal reception.

In some environments, digital television signals may be broadcast for reception with appropriate receiving equipment. Digital television signals are subject to multipath effects, particularly in urban environments and in buildings. Receiving equipment should compensate for multipath effects.

BRIEF DESCRIPTION OF THE DRAWINGS/FIGS.

The detailed description is described with reference to the accompanying figures.

FIG. 5A is a side-view and FIG. 5B is a top view of one embodiment of an antenna assembly.

FIG. 5C is a side-view and FIG. 5D is a top view of one embodiment of an antenna assembly.

FIG. 5E is a side-view and FIG. 5F is a top view of one embodiment of an antenna assembly.

FIG. 8 is a schematic illustration of one embodiment of a data table that may be implemented in a system for digital television reception.

DETAILED DESCRIPTION OF THE INVENTION

Described herein are exemplary systems and methods for digital television signal reception. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
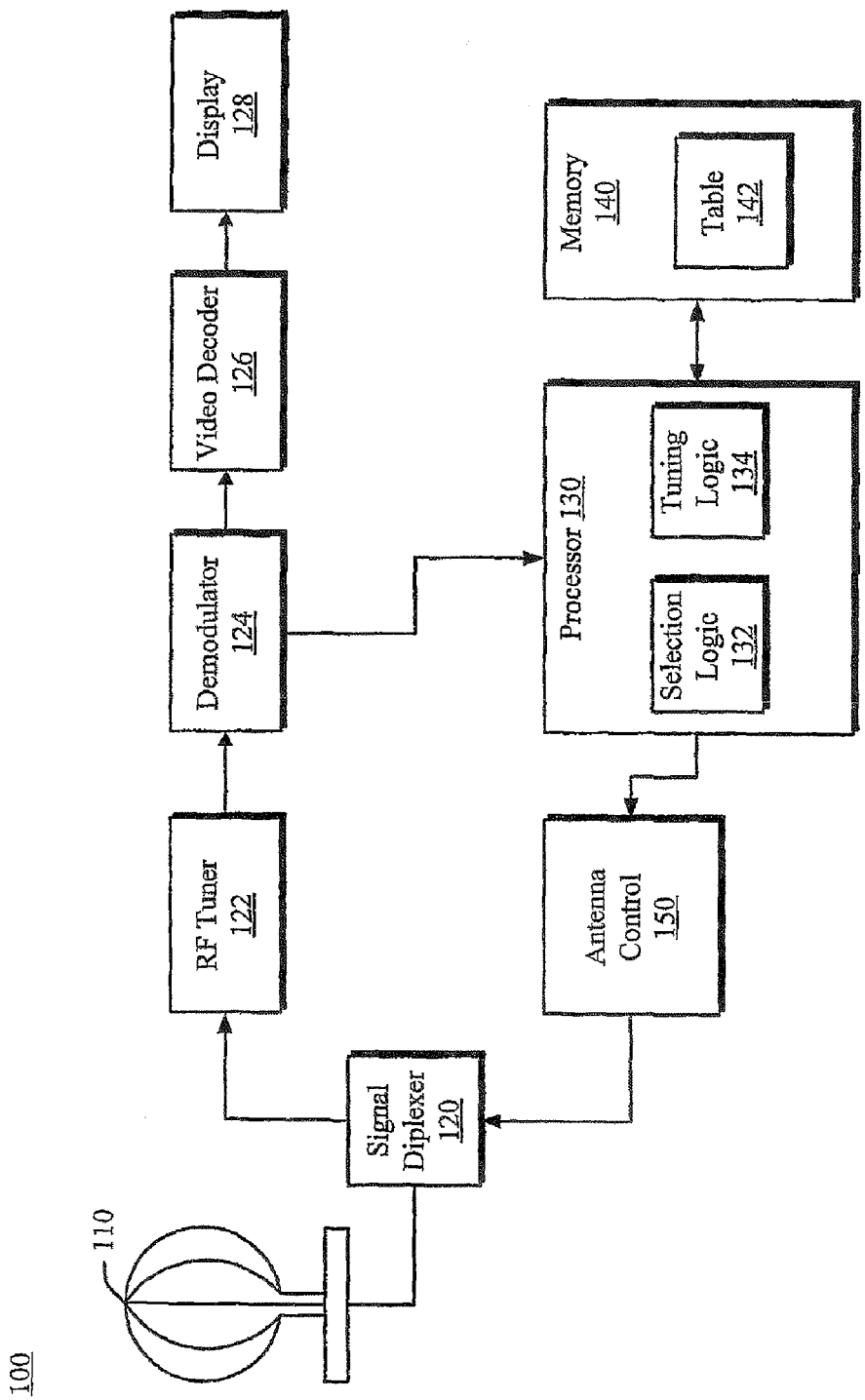
FIG. 1 is a schematic illustration of a system for digital television signal reception.

FIG. 1 is a schematic illustration of a system 100 for digital television signal reception. Referring briefly to FIG. 1, system 100 comprises at least one antenna assembly 110 and signal processing circuitry to process digital television signals for display including a signal diplexer 120, an RF Tuner 122, a demodulator 124, and a video decoder 126.

The purpose of the RF tuner is to select a channel from the RF spectrum and translate it to a lower frequency that allows the operation of the demodulator to occur at a much lower processing speed. The demodulator 124 receives a single channel translated to a lower frequency, e.g., an intermediate frequency (IF) and decodes the IF analog signal to a digital stream. This digital stream is processed by the video decoder 126 which provides signals that can be directed to a display 128 such as, e.g., a television or a LCD display.

System 100 further includes a processor 130, a memory module 140 and an antenna control module 150. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Memory module 140 may be implemented as a volatile memory module (e.g., a ROM), a non-volatile memory module (e.g., a RAM) or a form of permanent memory such as, e.g., a magnetic disk or tape or an optical disk such as, e.g., a writeable CD-ROM or DVD-ROM. In addition, processor 130 and memory module 140 may be integrated into a single integrated circuit such as, for example, a field programmable gate array (FPGA) or an application specific integrated circuit (ASIC). Alternatively, the selection logic module 132 and the tuning logic module 134 may be reduced to hard-wired circuitry.

Processor 130 comprises a selection logic module 132 to select an antenna to receive a digital television signal for a specific channel, and a tuning logic module 134 that generates and transmits a signal to antenna control module 150 to configure the antenna assembly to receive a signal via a selected antenna. Memory module 140 comprises a table 142 that may be used by the selection logic module 132 and the tuning module 134. The operation of selection logic module 132, tuning logic module 134, and antennal control module 150 are described in greater detail below.

Figure 2A:
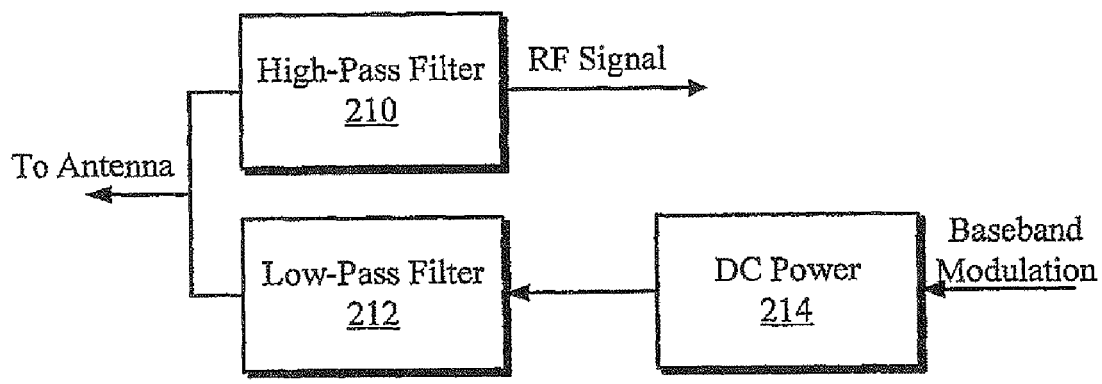
FIGS. 2A-2C are schematic illustrations of diplexer components and operational characteristics.
Figure 2B:
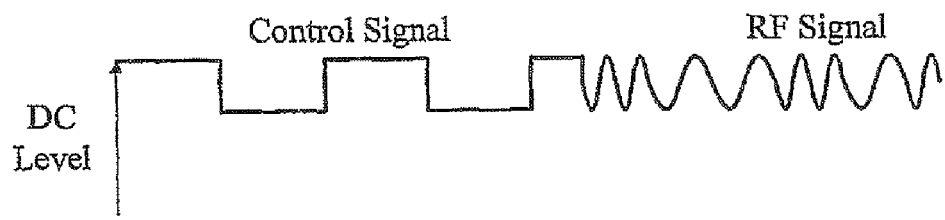
Figure 2C:
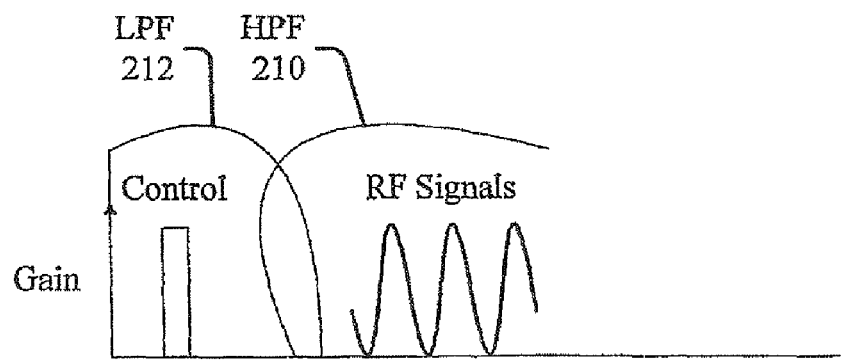

Operation of the diplexer 120 will be explained with reference to FIGS. 2A-2C. FIGS. 2A-2C are schematic illustrations of diplexer components and operational characteristics. FIG. 2A is a schematic illustration of subcomponents of the diplexer 120 of FIG. 1. FIG. 2B is a schematic illustration of signal modulation. FIG. 2C is a schematic illustration of the frequency response and placement of the DC, control, and RF signals relative to the filters.

Referring first to FIG. 2A, in one embodiment, diplexer 120 comprises a High Pass Filter (HPF) 210 and a Low Pass Filter (LPF) 212. In one embodiment, the DC power supply is modulated by a control signal from the processor which is depicted in the signal drawing of FIG. 2B. The modulated DC signal is passed through LPF 212, which allows the control signal and the DC signal to pass up a coaxial cable to an antenna, but blocks the RF signals from entering into the DC power supply 214. FIG. 2C illustrates the frequency response of the Diplexer. The DC component and control signals are seen to exist in the LPF 212 response curve. The RF channels are present in the HPF 210 response curve but are blocked from entering the DC supply 214 by the LPF 212 band-stop region. Similarly, the DC and Control signals are blocked from entering the tuner by the HPF 210 band-stop region.

After the control signal has been transmitted, the RF signal can flow from the antenna to the tuner 122, which is also depicted in FIG. 2B. The RF signals are at a much higher frequency then the control signal, thus the HPF filter 210 allows them to pass to the tuner 122. The LPF 212 of the diplexer 120 prevents the RF signal from passing through and losing power in the DC power supply 214.

Referring to FIG. 2B, the DC signal is always present so that it can provide power to the antenna. The control signal is sent by modulating the DC level of the power supply during programming of the antenna. Once the control signal is received the antenna can produce an RF signal riding on the DC power level. (The signals are not drawn to scale in either time or level, but illustrate the construction of the various signals.) The RF signal is provided from the antenna through the HPF 210 to the tuner for demodulation. The DC and control signal are provided to the antenna through the LPF 212, which is connected to the output connector of the receiver. The diplexer allows lossless combining of the signals (both RF and low frequency) because they are operating at much different frequencies. A very similar circuit is constructed on the antenna and will be explained in FIG. 3.0.

Figure 3:
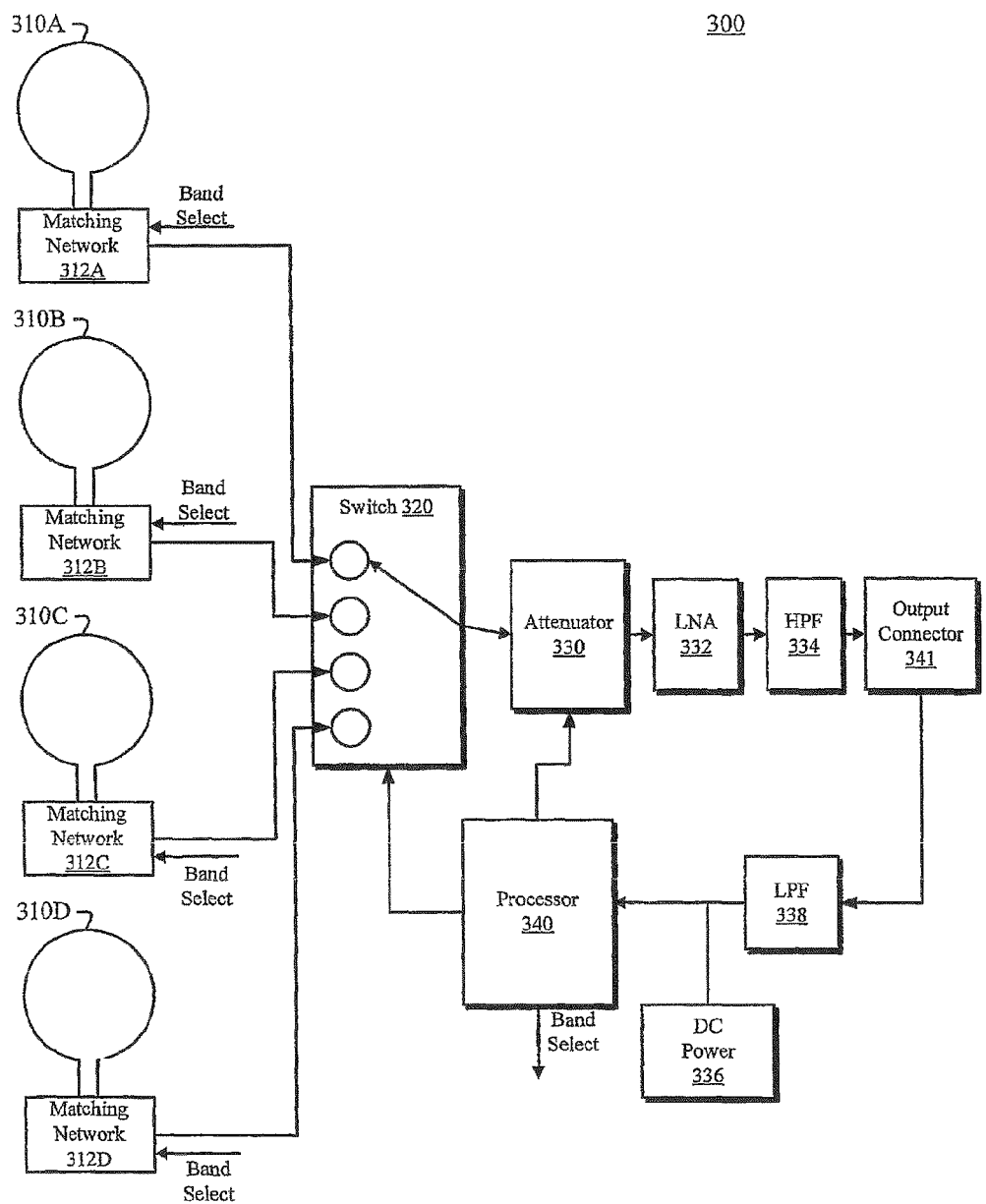
FIG. 3 is a schematic illustration of an antenna subsystem for digital television signal reception.

FIG. 3 is a schematic illustration of an antenna subsystem for digital television signal reception. Referring to FIG. 3, antenna subsystem 300 comprises a plurality of antennas 310A, 310B, 310C, 310D coupled to respective matching networks 312A, 312B, 312C, 312D. The matching networks allow RF energy to be coupled effectively over a complete octave of bandwidth for the UHF band (e.g., 470 to 800 MHz). The circumference of the loop antenna may be set at the wavelength of the center of the band for this frequency span or around 0.5 meters. This corresponds to approximately 6 inches in diameter. An additional network may be added to provide matching at the upper VHF frequencies (180 MHz to 216 MHz). The matching network may be modified to work effectively with antenna operating at frequencies far below a wave-length which in for the VHF case is about one-third (⅓) of a wavelength. This means during operation in the UHF band the antennas use a separate matching network for that band and another network for the upper VHF band. The information is provided by the channel number (7-13 is upper VHF, 14-66 is UHF). These frequencies can be scaled to other bands but the embodiment depicted in FIG. 3 is directed at reception of Digital Terrestrial Signals that are confined primarily to the UHF and upper VHF spectrums.

In one embodiment antennas 310A, 310B, 310C, 310D may be embodied as loop antennas having a diameter that measures between 15 centimeters and 25 centimeters.

Subsystem 300 further comprises a switch 320 coupled to an attenuator 330, which is in turn coupled to a low noise amplifier (LNA) 332. LNA 332 is coupled to the output connector 341 through a high pass filter (HPF) 334. HPF 334 prevents the DC signal from entering the output of the LNA 332. A LPF 338 blocks the RF power from entering the DC power supply 336 and processor block 340. In one embodiment, an additional circuit in the processor 340 removes the DC component of the control signal. The processor module 340 decodes the control waveform as depicted in FIG. 2B to determine the proper antenna alignment, power level, and matching network.

Figure 4B:
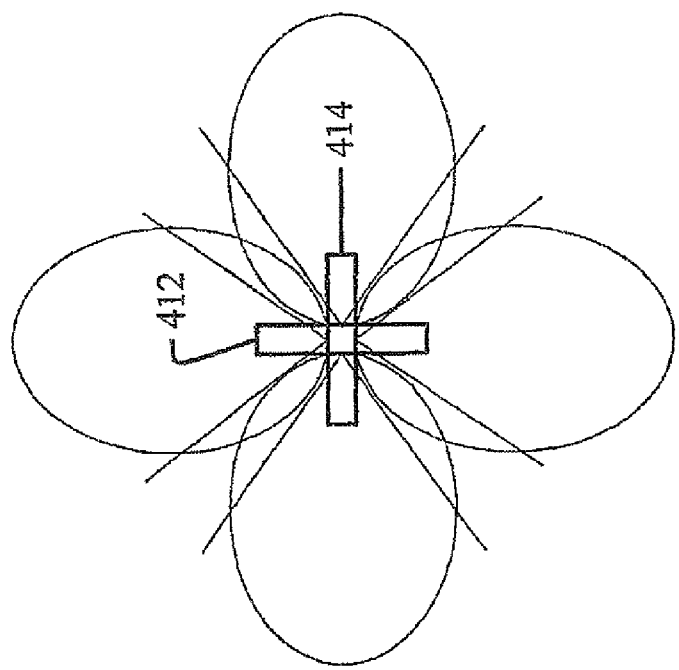
FIGS. 4A and 4B are schematic illustrations of antenna lobes.
Figure 4A:
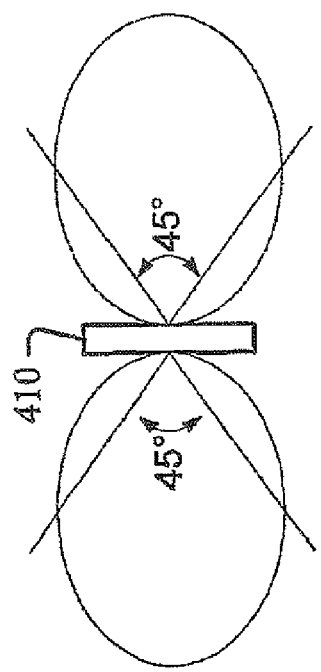

In the embodiment depicted in FIG. 3, antennas 310A, 310B, 310C, 310D are depicted as loop antennas. FIGS. 4A and 4B are schematic illustrations of reception lobes for loop antennas. Referring to FIG. 4A, a single loop antenna element 410 presents a two-sided reception profile, each of which has an effective beam width of approximately 45 degrees on either side of the antenna. Thus, referring to FIG. 4B, an antenna that has two elements 412, 414 provides a four-sided reception profile, each of which has an effective beam width of approximately 45 degrees on either side of the antenna.

Thus, an antenna that provides a 360 degree beam profile can be constructed using four antenna elements disposed at 45 degree angles. FIG. 5A is a side-view and FIG. 5B is a top view of one embodiment of an antenna assembly 510. Referring to FIGS. 5A and 5B, antenna assembly 510 comprises a base 512, a first antenna element 514 and a second antenna element 516 disposed approximately at a ninety degree angle relative to the first antenna element 514. Antenna assembly 510 further includes a third antenna element 518 and a fourth antenna element 520 disposed approximately at a ninety degree angle relative to the third antenna element 518. Further, antenna elements 518, 520 are oriented approximately at a 45 degree offset from the orientation of elements 514, 516.

FIG. 5C is a side-view and FIG. 5D is a top view of one embodiment of an antenna assembly 530. Referring to FIGS. 5C and 5D, antenna assembly 530 comprises a base 532, a first antenna element 534 and a second antenna element 536 disposed approximately at a ninety degree angle relative to the first antenna element 534. Antenna assembly 530 further includes a third antenna element 538 and a fourth antenna element 540 disposed approximately at a ninety degree angle relative to the third antenna element 538. Further, antenna elements 538, 540 are oriented approximately at a 45 degree offset from the orientation of elements 534, 536. In addition, antenna elements 538, 540 are physically displaced from antenna elements 534, 536 by a distance D in a horizontal plane to provide a degree of physical diversity in the antenna configuration. In one embodiment, the distance D measures at least the diameter of an antenna element, or between 15 and 25 centimeters.

FIG. 5E is a side-view and FIG. 5F is a top view of one embodiment of an antenna assembly 550. Referring to FIGS. 5E and 5F, antenna assembly 550 comprises a base 552, a first antenna element 554 and a second antenna element 556 disposed approximately at a ninety degree angle relative to the first antenna element 554. Antenna assembly 550 further includes a third antenna element 558 and a fourth antenna element 560 disposed approximately at a ninety degree angle relative to the third antenna element 558. Further, antenna elements 558, 560 are oriented approximately at a 45 degree offset from the orientation of elements 554, 556. In addition, antenna elements 558, 560 are physically displaced from antenna elements 554, 556 by a distance D in a vertical plane to provide a degree of physical diversity in the antenna configuration. In one embodiment, the distance D measures at least the diameter of an antenna element, or between 15 and 25 centimeters.

Thus, the antenna assemblies 510, 530, 550 provide a complete 360 degrees of beam width coverage. The physical separation of the antenna elements in antenna assemblies 530 and 550 provides physical diversity, which aids in receiving independent signal paths in a multi-path environment.

Having described structural components of embodiments of a system to receive digital television signals, operations implemented in a system will now be described with reference to FIGS. 6-7. In one embodiment, the operations of FIGS. 6-7 may be implemented as logic instructions stored in a computer-readable medium such as, e.g., a memory module. When executed by a processor, the logic instructions may configure the processor to perform the operations described in FIGS. 6-7.

Figure 6:
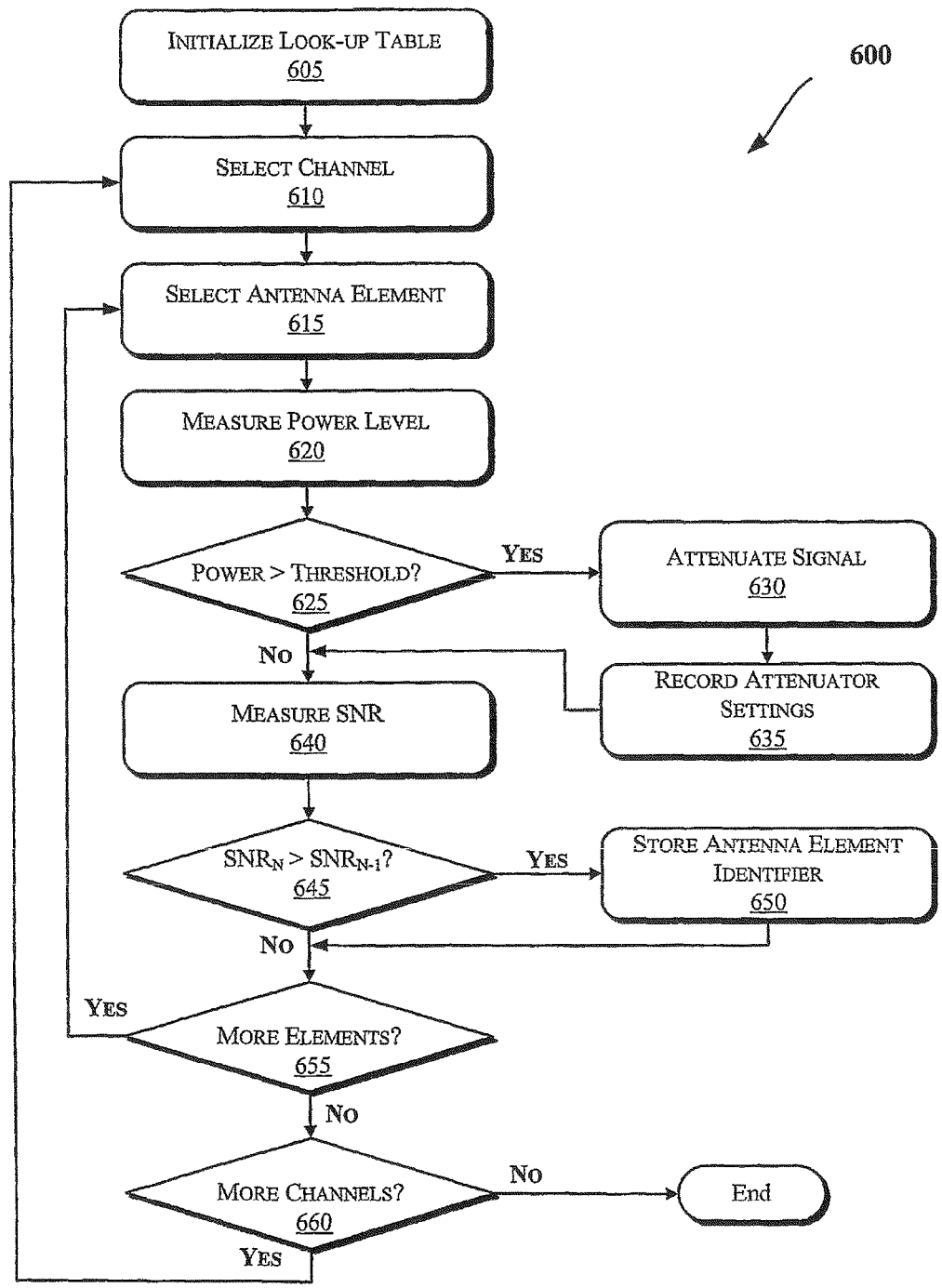
FIG. 6 is a flowchart illustrating operations in one embodiment of a channel scanning procedure that may be implemented in a system for digital television reception.

FIG. 6 is a flowchart illustrating operations in one embodiment of a selection procedure that may be implemented in a system for digital television reception. The selection procedure will be explained with reference to the structure depicted in FIGS. 1 and 3. The selection procedure may correspond to the selection logic module 132 depicted in FIG. 1. In one embodiment, the selection procedure briefly samples the signal-to-noise (SNR) ratio for each antenna for a given channel and stores in the data table an indicator of the antenna that has the best SNR characteristics for a given channel.

Referring to FIG. 6, at operation 605 a look up table is initialized. In one embodiment, the look up table may correspond to the look up table 142 in memory module 140, and initializing the look up table may comprise establishing a block in memory module 140 to hold the look up table. FIG. 8 is a schematic illustration of one embodiment of a data table that may be implemented in a system for digital television reception. In one embodiment, the memory table may comprise entries relating a channel to its associated antenna, attenuator settings, and a signal-to-noise ratio.

At operation 610 a channel is selected. In one embodiment the channel may be defined by a frequency range, one or more time slot arrangements within a frequency range, or an encoded signal which may be spread across a frequency range.

At operation 615 a first antenna element is selected to receive an input signal. Referring briefly to FIG. 3, in one embodiment, the processor 340 transmits an antenna selection signal to switch 320 which causes switch 320 to accept an input from one of the antennas 310A, 310B, 310C, 310D. For purposes of illustration, it will be assumed that the antenna selection signal identifies antenna 310A. In addition, processor 340 transmits a band selection signal to the selected antenna. In one embodiment the band select refers to a region of spectrum used by the digital TV. In more general terms the band could be any defined region of frequencies with arbitrary channel spacing. The band selection signal is input to the matching network 312A of the antenna 310A, which tunes the antenna to the selected channel matching network.

At operation 620 the power level of the signal received on the selected antenna is measured. In one embodiment, a power level measurement may be taken from the demodulator 124. If, at operation 625, the power level measurement exceeds a threshold, then control passes to operation 630 and the signal is attenuated (e.g., by attenuator 330) to a power level that is less than the threshold. In one embodiment the threshold may be determined as a function of the circuitry used to control the tuner power level or automatic gain control. At operation 635 the settings of the attenuator are recorded in the memory table 800 and control passes to operation 840.

If, at operation 625, the power level measurement does not exceed the threshold, control passes to operation 640. At operation 640 the SNR is measured. In one embodiment a SNR measurement may be taken from the demodulator 124. Operations 645 and 650 serve to store in a memory module an identifier associated with the antenna element(s) for which the SNR level exceeds a threshold. In one embodiment, the threshold represents the highest SNR measured from the plurality of antennas. Thus, if, at operation 645, the SNR measurement for the current antenna exceeds the SNR measurement of the previous antenna measured for this channel, then control passes to operation 650 and an antenna element identifier is stored in the memory table 800, and control then passes to operation 655. In one embodiment, the SNR may also be stored in association with the antenna element in memory table 800. In alternate embodiments the threshold may be a static value or may be a dynamic value, and multiple antenna identifiers may be stored for each channel.

If, at operation 655, there are more antenna elements to sample for the current channel, then control passes back to operation 615 and the next antenna element is selected. Thus, operations 615 to 655 define an inner loop which samples SNR settings from each antenna element in the system for a given channel and stores an identifier associated with the antenna that gives the strongest SNR reading for the given channel.

If, at operation 655 there are no further antenna elements to test for the given channel, then control passes to operation 660. If, at operation 660 there are additional channels to evaluate, then control passes back to operation 610 and the next channel is selected. The test at operations 660 defines an outer loop which passes each channel through the SNR selection process defined by operations 615 to 655.

Thus, the operations of FIG. 6 constructs a table in memory such as the table 800 depicted in FIG. 8. The table 800 associates with each channel the antenna that resulted in the strongest SNR reading during the selection process, and optionally associates an attenuator setting and a SNR reading with the antenna. This table may be used by tuning logic module 134 to select an antenna to receive a signal.

Figure 7:
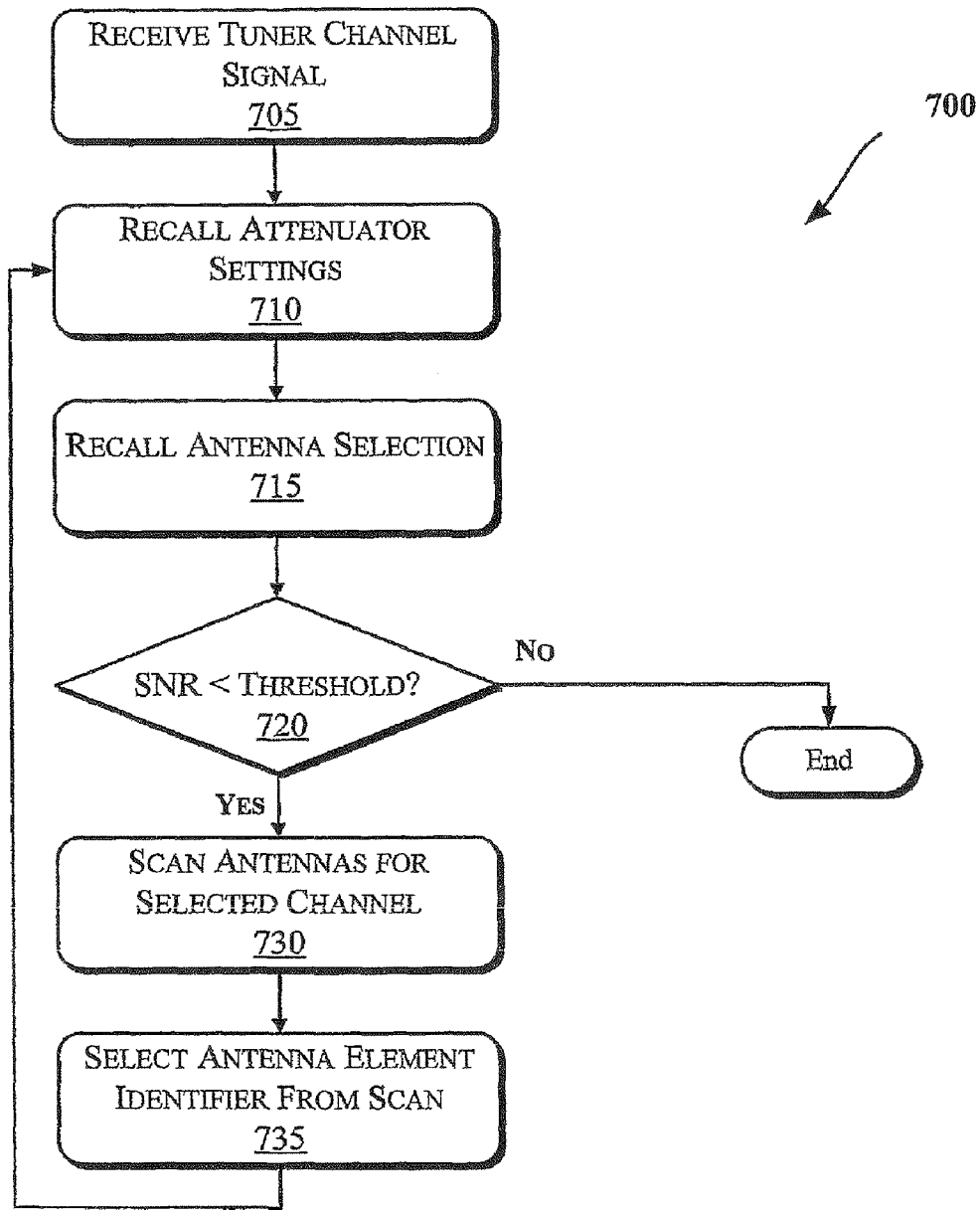
FIG. 7 is a flowchart illustrating operations in one embodiment of a tuning procedure that may be implemented in a system for digital television reception.

FIG. 7 is a flowchart illustrating operations in one embodiment of a tuning procedure that may be implemented in a system for digital television reception. In one embodiment the operations of FIG. 7 may be implemented by tuning logic module 134. Referring to FIG. 7, at operation 705 a tuner channel signal is received. In one embodiment the tuner channel signal may be received via a user interface such as, e.g., a remote control tuner or a channel selector input button.

At operation 710 attenuator settings for the selected channel are recalled from the memory table 800. In one embodiment, the attenuator settings may be passed to the attenuator 330. At operation 715 the antenna selection for the selected channel is recalled from the memory table. In one embodiment, the processor 340 transmits to switch 320 an antenna selection signal for the antenna associated with the selected channel in memory table 800 and transmits a band selection signal to the selected antenna. In response, switch 320 is set to receive an input from the selected antenna, which configures its matching network to tune to the selected channel.

If, at operation 720, the SNR from the selected antenna is greater than a threshold, then the tuning procedure may end. In one embodiment, the threshold SNR can be set to be a minimum number necessary for the demodulator to work. This check is necessary in case the signal changed or had a false detection during the initial process in 605.

By contrast, if at operation 720 the SNR from the selected antenna is less than a threshold control passes to operation 730 and the SNR measurements for the selected channel are scanned. In one embodiment operation 730 may utilize the same procedure described with reference to operations 615 to 655, above. At operation 735 the antenna identifier stored in memory table during the scan process (see operation 635) is selected, and control passes back to operation 710. Thus, the operations of FIG. 7 permit the antenna subsystem 300 to tune to the antenna that resulted in the strongest SNR during the selection process, and to implement a new selection process if the SNR for the selected channel is insufficiently strong.

The antenna elements depicted in FIGS. 1-4 are commonly referred to as "loop" antenna elements. In alternate embodiments antennas of different geometries may be implemented. For example, the antenna elements may be implemented as dipoles, folded dipoles and/or bowtie antennas. The number of elements is not restricted in theory and could be increased if necessary by adding elements with less beam width and more gain. For instance antenna structures with 22.5 degrees of beam width could be used with 8 elements and still cover the 360 degree requirement. This would utilize angles of separations less then 90 degrees in the same plane or more orthogonal pairs of elements to be added to the base structure and separated in space either vertically or horizontally.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An antenna assembly, comprising:
   a first antenna, positioned to maximize reception in a first direction, configured to receive radio frequency (RF) energy from a first frequency band and a second frequency band, the first frequency band being different from the second frequency band;
   a first matching network configured to pass RF energy from the first antenna, the first matching network including:
      a first matching sub-network configured to pass the RF energy from the first frequency band; and
      a second matching sub-network configured to pass RF energy from the second frequency band,
      wherein the first matching sub-network and the second matching sub-network are selected in response to a second control signal;
   a second antenna, positioned to maximize reception in a second direction, the second direction being different from the first direction, configured to receive RF energy from the first frequency band;
   a second matching network configured to pass the RF energy from the second antenna; and
   a switching module, coupled to the first and the second matching networks, configured to select the RF energy from the first antenna or the RF energy from the second antenna in response to a first control signal.

2. The antenna assembly of claim 1, wherein the second antenna is further configured to receive RF energy from the second frequency band.

3. The antenna assembly of claim 1, wherein the first frequency band is an Ultra High Frequency (UHF) band and the second frequency band is a Very High Frequency (VHF) band.

4. The antenna assembly of claim 1, further comprising:
   a processor configured decode a control waveform to provide the first and the second control signals.

5. The antenna assembly of claim 1, further comprising:
   a third antenna, positioned to maximize reception in a third direction, configured to receive RF energy from the first frequency band, the third direction being different from the first and the second directions; and
   a fourth antenna, positioned to maximize reception in a fourth direction, the fourth direction being different from the first, the second, and the third directions, configured to receive RF energy from the first frequency band.

6. The antenna assembly of claim 5, wherein the first, the second, the third, and the fourth antennas are disposed at approximately forty five degree angles relative to each other.

7. The antenna assembly of claim 5, wherein the first antenna is disposed approximately at a ninety degree angle relative to the second antenna,
   wherein the third antenna is disposed approximately at a ninety degree angle relative to the fourth antenna, and
   wherein the first and the second antennas are oriented approximately at a forty five degree offset from the third and the fourth antennas.

8. The antenna assembly of claim 7, wherein the first and the second antennas are displaced from the third and the fourth antennas in a horizontal direction.

9. The antenna assembly of claim 7, wherein the first and the second antennas are displaced from the third and the fourth antennas in a vertical direction.

10. The antenna assembly of claim 5, wherein the first, the second, the third, and the fourth antenna are configured and arranged to approximately provide a 360 degree beam profile.

11. The antenna assembly of claim 5, further comprising:
a third matching network configured to pass RF energy from the third antenna; and
a fourth matching network configured to pass the RF energy from the fourth antenna,
wherein the switching module is further configured to select the RF energy from the first antenna, the RF energy from the second antenna, the RF energy from the third antenna, the RF energy from the fourth antenna in response to the first control signal.

12. The antenna assembly of claim 11, wherein each of the second, the third, and the fourth matching networks comprise:
a first matching sub-network configured to pass the RF energy from the first frequency band; and
a second matching sub-network configured to pass RF energy from a second frequency band, the second frequency band being different from the first frequency band,
wherein the first matching sub-network and the second matching sub-network are selected in response to a second control signal.

13. The antenna assembly of claim 1, wherein at least one of a group consisting of the first and the second antennas is configured and arranged to form at least one of a group consisting of a loop antenna, a dipole antenna, a folded dipole antenna, and a bowtie antenna.

14. The antenna assembly of claim 5, wherein at least one of a group consisting of the first, the second, the third, and the fourth antennas is configured and arranged to form at least one of a group consisting of a loop antenna, a dipole antenna, a folded dipole antenna, and a bowtie antenna.

15. The antenna assembly of claim 1, further comprising:
a processing module configured:
(i) to measure a first signal to noise ratio of the RF energy passed from the first antenna and a second signal to noise ratio of the RF energy passed from the second antenna, and
(ii) to produce the first control signal that causes the switching module to select the RF energy from the first antenna when the first signal to noise ratio is larger than the second signal to noise ratio or to select the RF energy from the second antenna when the first signal to noise ratio is smaller than the second signal to noise ratio.

16. A method for selecting an antenna from a plurality of antennas by a digital television reception system, comprising:
(a) measuring, by the digital television reception system, signal to noise ratios of signals received by each antenna from the plurality of antennas;
(b) assigning, by the digital television reception system, an antenna element identifier for each antenna, wherein the antenna element identifier includes the signal to noise ratio of the signals received by each antenna;
(c) storing, by the digital television reception system, the antenna element identifier in a look up table; and
(d) selecting, by the digital television reception system, an antenna from among the plurality of antennas with a largest signal to noise ratio from the look up table.

17. The method of claim 16, further comprising:
(e) selecting, by the digital television reception system, a channel from among a plurality of channels; and
(f) configuring the plurality of antennas to receive the channel.

18. The method of claim 17, wherein step (f) further comprises:
(f)(i) determining, by the digital television reception system, whether a power level of the signals received by each antenna exceeds a power threshold; and
(f)(ii) attenuating, by the digital television reception system, the signals received by each antenna when the power level exceeds the power threshold.

19. The method of claim 16, wherein step (a) comprises:
(a)(i) determining, by the digital television reception system, whether each of the signal to noise ratios for the signals received by each antenna exceeds a signal to noise ratio threshold.

20. The method of claim 19, wherein step (d) further comprises:
(d)(i) sampling, by the digital television reception system, the antenna element identifier in the look up table for each of the antennas with received signals that exceed the signal to noise ratio threshold.

* * * * *

UNITED STATES PATENT AND TRADEMARK OFFICE
CERTIFICATE OF CORRECTION

| | | |
|---|---|---|
| PATENT NO. | : 8,144,260 B2 | Page 1 of 1 |
| APPLICATION NO. | : 12/815630 | |
| DATED | : March 27, 2012 | |
| INVENTOR(S) | : Keate et al. | |

It is certified that error appears in the above-identified patent and that said Letters Patent is hereby corrected as shown below:

Column 1, lines 6-8, "This application is a continuation of U.S. patent application Ser. No. 11/915,262, filed May 25, 2006, now U.S. Pat. No. 7,738,046," please replace with --This application is a continuation of U.S. patent application Ser. No. 11/915,262, with a 35 U.S.C. §371(c) filing date of July 7, 2008, now U.S. Pat. No. 7,738,046,--.

Column 1, lines 12-14, "U.S. patent application Ser. No. 11/915,262, filed May 25, 2006, is incorporated herein by reference in its entirety." please replace with --U.S. patent application Ser. No. 11/915,262, with a 35 U.S.C. §371(c) filing date of July 7, 2008, now U.S. Pat. No. 7,738,046, is incorporated herein by reference in its entirety--.

Column 8, lines 42-43, "a processor configured decode a control waveform to provide the first and the second control signals." please replace with --a processor configured to decode a control waveform to provide the first and the second control signals--.

Signed and Sealed this
Twenty-fourth Day of July, 2012

David J. Kappos
*Director of the United States Patent and Trademark Office*